US007980325B2

(12) United States Patent
Botefuhr et al.

(10) Patent No.: US 7,980,325 B2
(45) Date of Patent: Jul. 19, 2011

(54) ROTATING SHAFT LOCKING MECHANISM

(75) Inventors: Harold R. Botefuhr, Bensenville, IL (US); Joseph Z. Wascow, Mundelein, IL (US); Ralf Bocka, Musberg (DE)

(73) Assignees: Credo Technology Corporation, Broadview, IL (US); Robert Bosch GmbH, Stuttgart (DE)

(*) Notice: Subject to any disclaimer, the term of this patent is extended or adjusted under 35 U.S.C. 154(b) by 1191 days.

(21) Appl. No.: 10/990,821

(22) Filed: Nov. 17, 2004

(65) Prior Publication Data

US 2005/0155227 A1 Jul. 21, 2005

(51) Int. Cl.
*B23B 45/02* (2006.01)

(52) U.S. Cl. .......................... 173/217; 173/216; 173/213

(58) Field of Classification Search .................... 173/48, 173/216, 217; 409/178, 182, 134
See application file for complete search history.

(56) References Cited

U.S. PATENT DOCUMENTS

| | | | | |
|---|---|---|---|---|
| 2,897,302 | A * | 7/1959 | Godfrey et. al. | 310/68 A |
| 4,400,995 | A * | 8/1983 | Palm | 74/527 |
| 4,672,836 | A * | 6/1987 | Wilkinson et al. | 72/479 |
| 5,191,968 | A * | 3/1993 | McCurry | 200/43.11 |
| 5,346,342 | A * | 9/1994 | Winchester | 409/134 |
| 5,496,139 | A * | 3/1996 | Ghode et al. | 409/182 |
| 5,590,988 | A * | 1/1997 | Rusconi | 409/182 |
| 6,350,087 | B1 * | 2/2002 | Berry et al. | 409/131 |
| 6,488,451 | B1 * | 12/2002 | Hartman | 408/124 |
| 6,568,887 | B2 * | 5/2003 | Hathcock et al. | 409/182 |
| 6,789,630 | B2 * | 9/2004 | Quirijnen et al. | 173/48 |

FOREIGN PATENT DOCUMENTS

| | | |
|---|---|---|
| EP | 0 890 420 | 1/1999 |
| EP | 1 129 826 | 9/2001 |
| EP | 1 166 973 | 1/2002 |

* cited by examiner

*Primary Examiner* — Lindsay Low
(74) *Attorney, Agent, or Firm* — Greer, Burns & Crain, Ltd.

(57) ABSTRACT

A locking mechanism for a rotary power tool that includes an elongated locking member that is retained by, and is at opposite first and second end portions within, at least one of a motor housing and a gearbox end casting and being slideable between unlocked and locked positions, the locking member first end portion being accessible by a user to move the locking member to the locked position. The locking member also includes a locking portion intermediate the first and second end portions that is configured to engage the non-circular configured portion of a rotatable armature shaft and prevent rotation thereof when the locking member is in its locked position. A biasing element is also included and configured to bias the locking member toward said unlocked position.

14 Claims, 6 Drawing Sheets

ROTATING SHAFT LOCKING MECHANISM

The present invention generally relates to power hand tools and more particularly to a shaft locking mechanism for such tools.

Many power hand tools have rotating cutting blades, grinding blades and other rotating tool accessories that may be mounted on an armature shaft of an electric motor that drives the rotating blade or the like. To change blades or other tools that are mounted in this manner, prior art systems have been designed and developed which enable the user to hold the blade stationary while a mounting nut or bolt can be removed. One way in which this has been done in the past is to have the armature shaft ground to produce a pair of opposed flats that can be engaged by a wrench or the like for holding the shaft while the nut is loosened and removed. However, a problem with grinding flats on the shaft is that the flats necessarily weaken the shaft, which may require utilization of a larger diameter stock metal shaft to compensate for the loss of strength resulting from the grinding of the flats.

Other systems use one or two holes in a gear hub or gear that is attached to the output shaft in which a pin or other protrusion is inserted to hold the shaft while the mounting nut can be removed. Another problem with both of these prior art configurations is that there are only one or two engagements per revolution of the blade which results in some inconvenience in quickly locking the shaft. Still other prior art systems have used a locking element that is a complementary gear that engages an output gear of the tool which can create unnecessary wear to the gear and reduce its useful life, particularly if the user brings the braking gear portion into contact with the output gear while the shaft is still turning. It is a goal of designers to develop a spindle lock mechanism that is inexpensive, effective and convenient to engage and which does not risk damage to the output gears or the like during operation.

SUMMARY OF THE INVENTION

A preferred embodiment of the spindle lock mechanism of the present invention comprises an elongated, preferably stamped steel locking member that is configured to fit within slotted openings in at least one of the motor housing end casting and the main housing, which comprises the locking member that has a spindle lock configuration that can be moved into engagement with a hex shaped bushing that is preferably press fit on the armature output shaft of the motor, and which is normally biased away from the armature shaft.

DESCRIPTION OF THE PREFERRED EMBODIMENT

While the preferred embodiment of the shaft locking mechanism of the present invention is shown with a circular saw, it should be understood that the mechanism may be adapted for use with other types of tools in which a blade or rotatable output shaft needs to be held in place while a blade bolt or blade nut is loosened so that a blade or other tool can be removed or installed.

Figure 1:
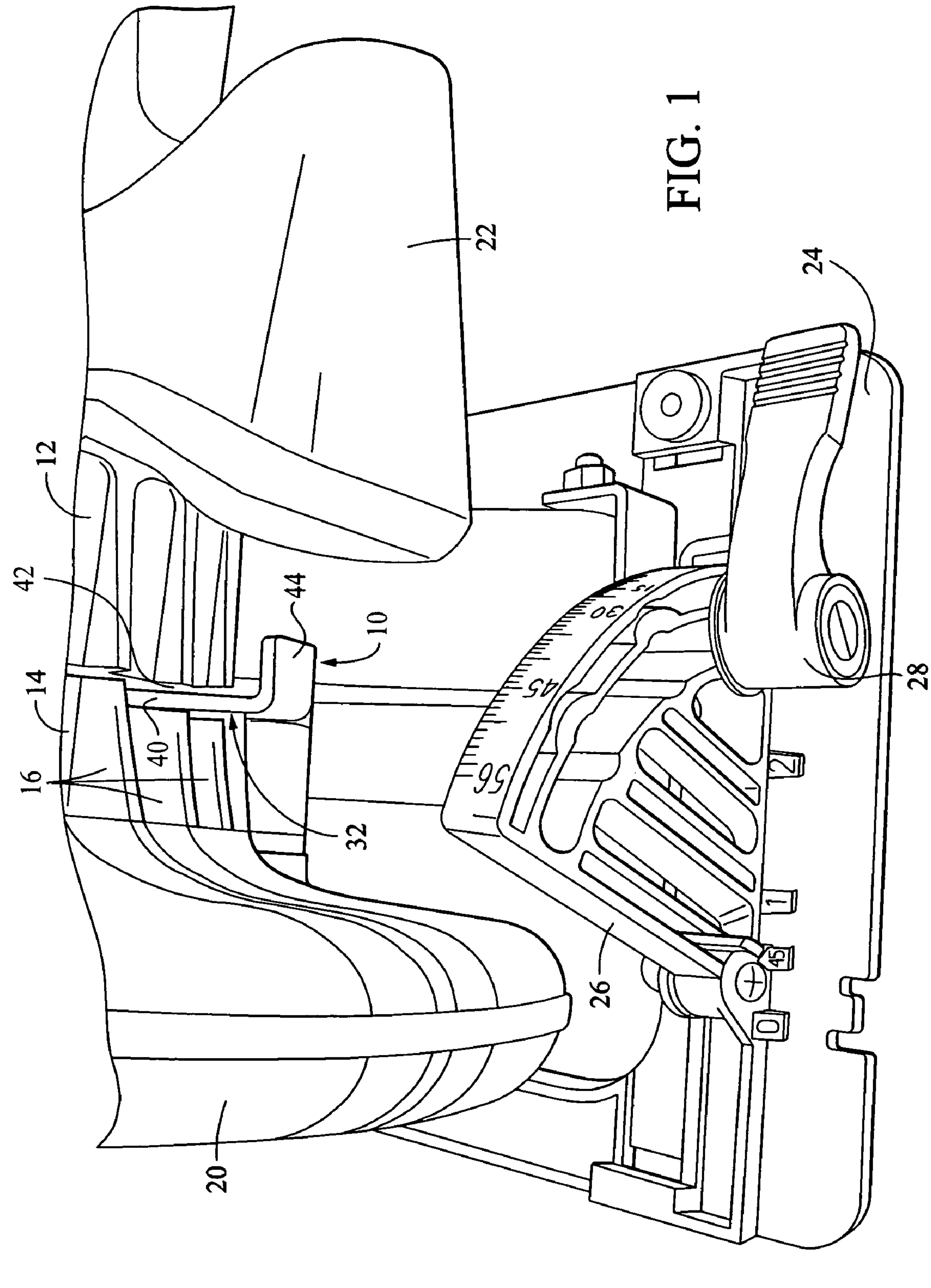
FIG. 1 is a front perspective of a circular saw which has a portion of the lock mechanism embodying the present invention illustrated therein.
Figure 2:
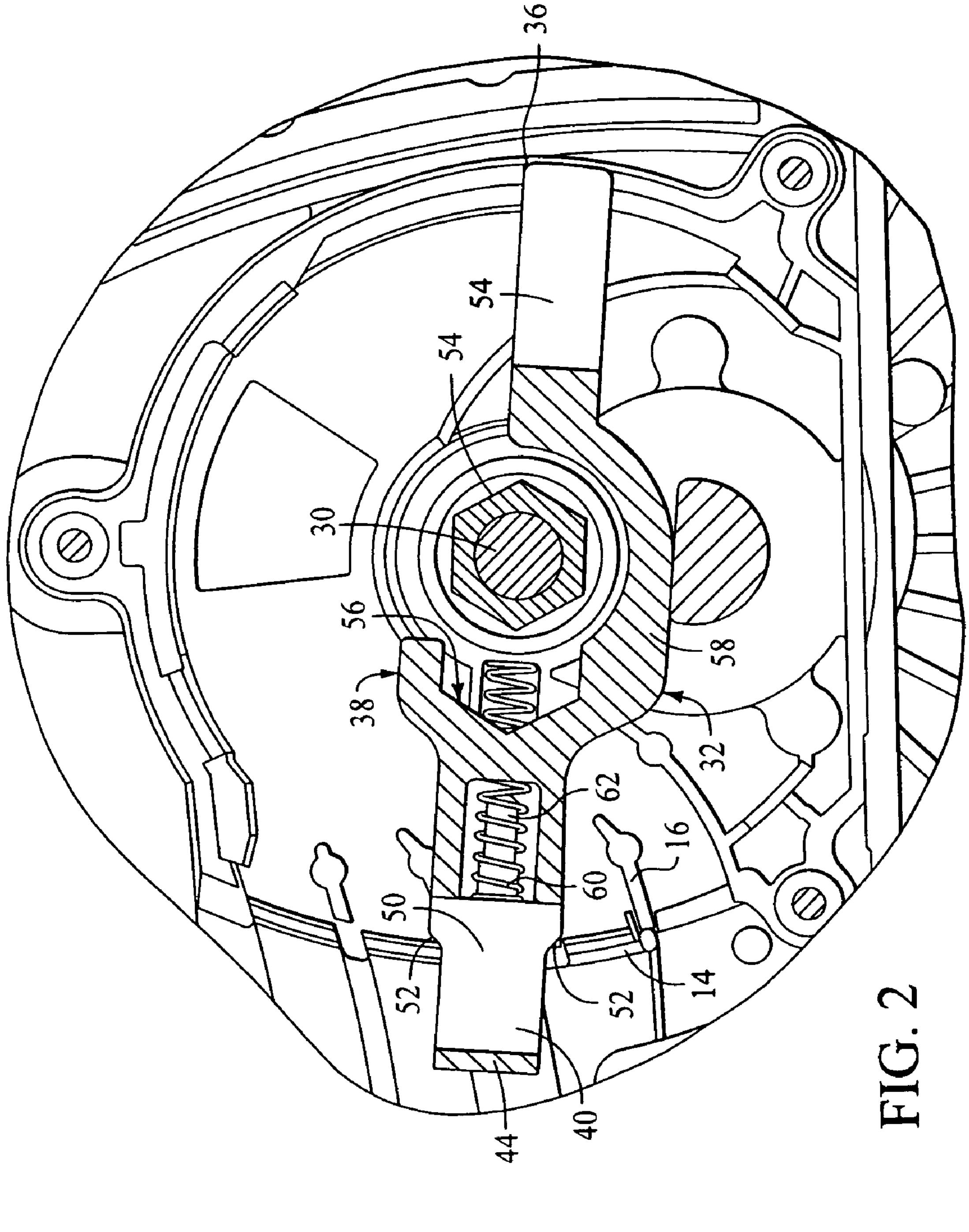
FIG. 2 is a diagrammatic plan view of the shaft locking mechanism assembled in a motor.
Figure 3:
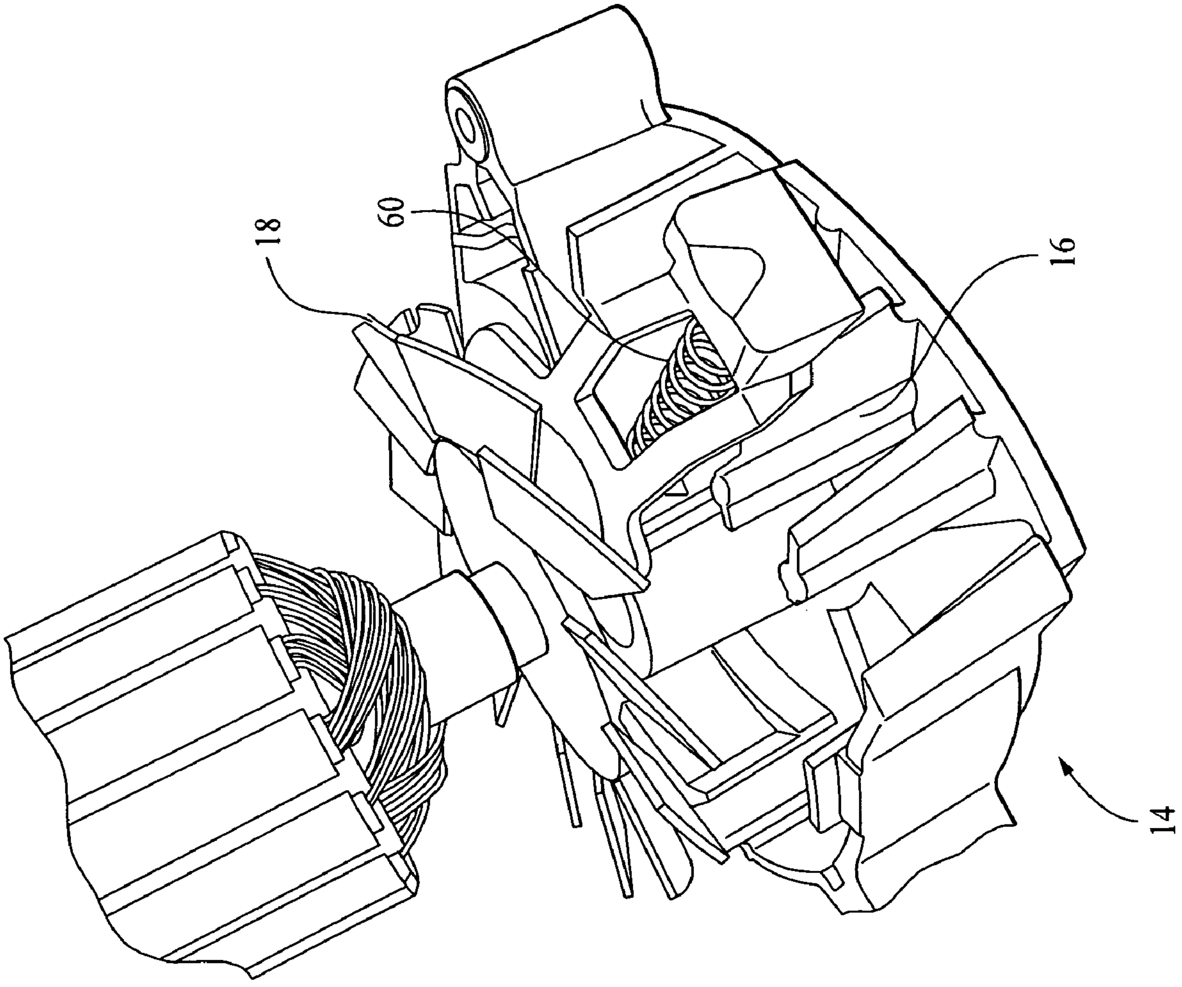
FIG. 3 is a perspective side view of portions of a motor used in the circular saw shown in FIG. 1 and which is illustrated together with the gearbox end casting and a major portion of the shaft locking mechanism embodying the present invention.

Turning now to the drawings, and particularly FIGS. 1 and 2, a circular saw is shown with a portion of the preferred shaft locking mechanism, indicated generally at 10, that is shown at an interface between a main motor housing 12 and a gearbox end casting 14 that is shown to have a number of louvers 16 through which air is exited during operation of the motor that has an associated fan blade 18 (FIG. 3). The circular saw has a saw blade housing 20 that surrounds a saw blade (not shown) and an auxiliary handle 22 as well as a foot 24 that has a bevel quadrant structure 26 and a locking mechanism 28. The saw blade is in turn coupled to a spindle or armature shaft 30 of an electric motor (not shown) that drives the saw blade or the like.

Figure 6:
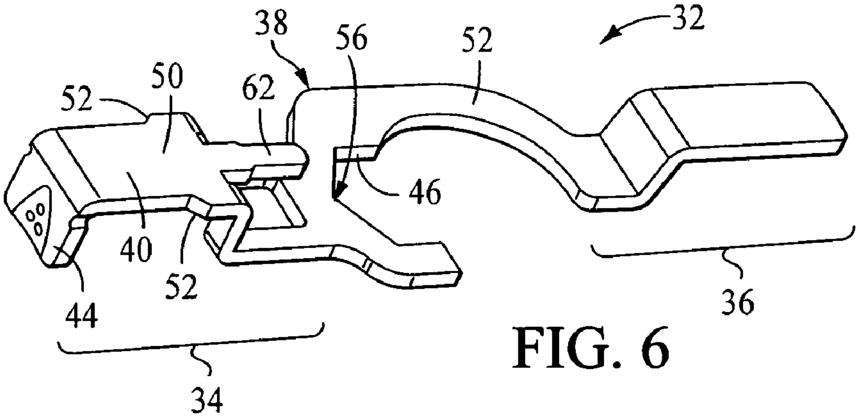
FIG. 6 is a perspective view of the locking member.
Figure 7:
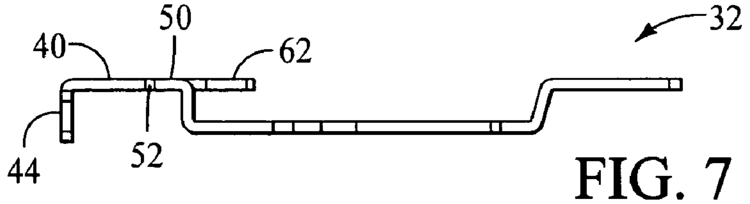
FIG. 7 is a side view of the locking member shown in FIG. 6.

Turning now to FIG. 6, the preferred shaft locking mechanism 10 includes an elongated locking member 32 having front and rear end portions 34, 36 with a spindle lock portion, designated generally at 38, disposed generally intermediate of the front and rear end portions. The front end portion 34 includes a front longitudinal portion 40 that extends through a slot 42 or other opening that is preferably located at the interface of the gearbox end casting 14 and the motor housing 12. At an external end of the front longitudinal portion 40 is a transverse end 44, which the operator can push inwardly to engage the spindle and lock it against rotation so that the saw blade may be removed.

More specifically, turning to FIG. 2, the armature shaft 30 may selectively be prevented from rotation by lockingly engaging the spindle lock portion 38 of the elongated locking member 32 to the armature shaft. Thus, the spindle lock portion 38 may be reciprocated between a locked and an unlocked position. To this end, the elongated locking member 32 is spring biased outwardly in an unlocked position so that the spindle lock portion 38 of the locking member will not engage the armature shaft 30 unless the operator selectively applies sufficient force to move it inwardly toward the armature shaft, which is the locked position.

Figure 4:
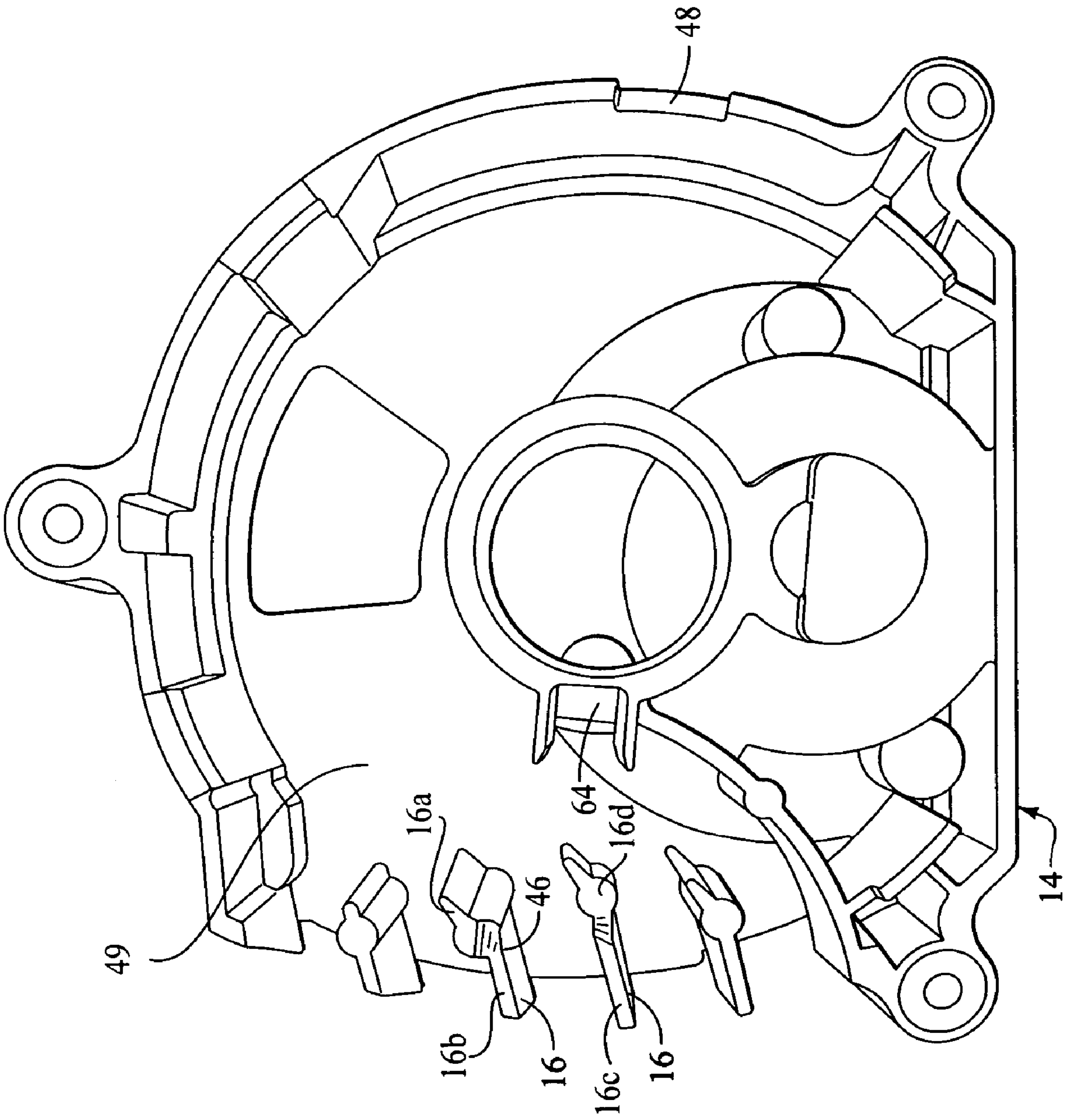
FIG. 4 is a view of the interior of the gearbox end casting in which the shaft locking mechanism substantially resides.
Figure 5:
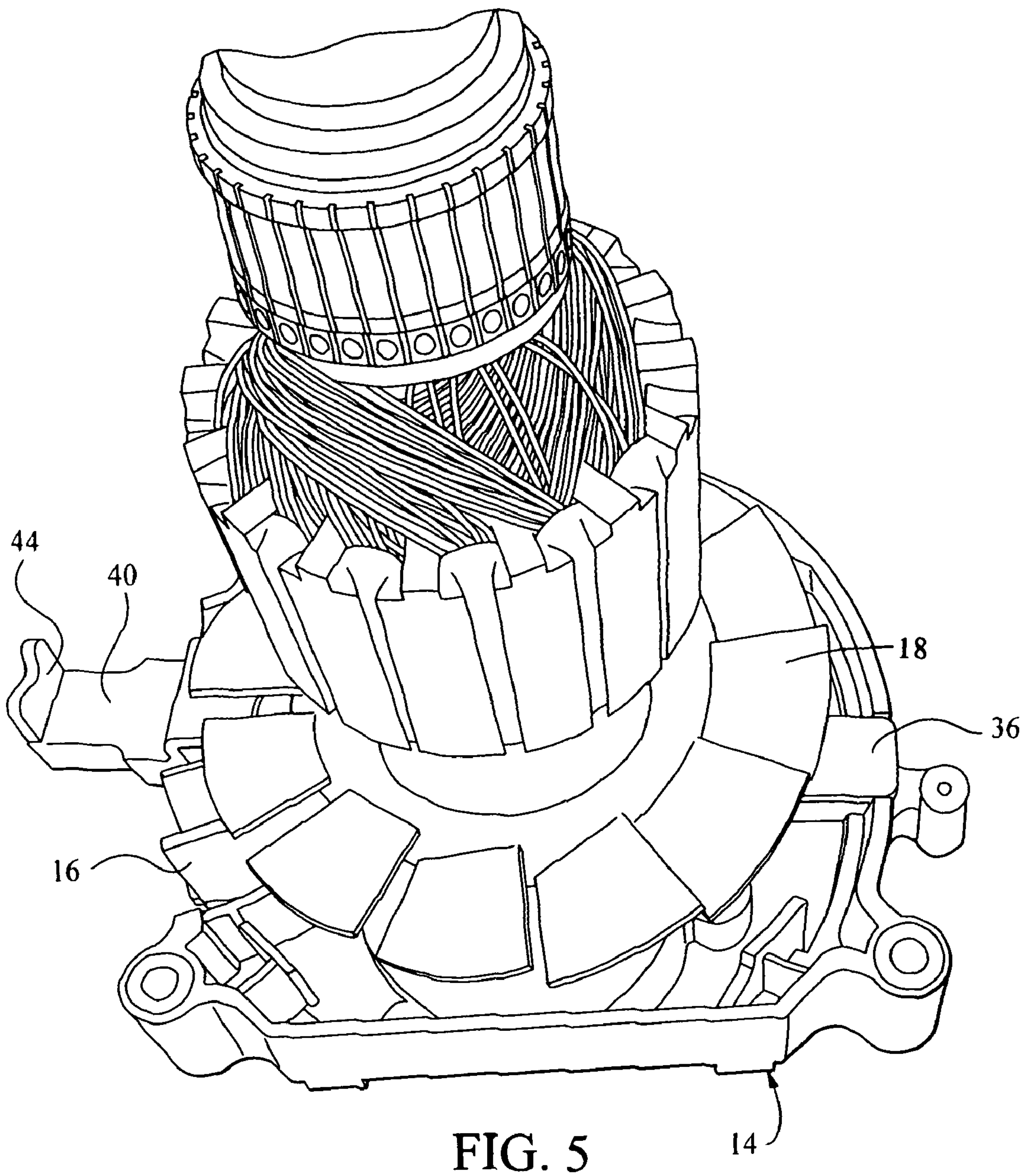
FIG. 5 is a perspective view of the end casting with the motor locking member shown with major portions of the motor.

As illustrated in FIG. 4, to retain the locking member 32, the gearbox end casting 14 preferably includes front and rear recesses 46, 48 that generally diametrically oppose one another. The front end portion 34 of the locking member 32 engages the front recess 46, which is preferably disposed in one of the louvers 16, while a distal end of the rear end portion 36 is preferably retained within the rear recess 48, which located on the opposite rear wall of the end casting 14. The louvers 16 extend from a side wall 49 such that distal surfaces thereof extend a predetermined distance from the side wall. While the distal surfaces some of the louvers 16 are planar, the front recess 46 is preferably formed by two louvers that each include at least two surfaces that are elevationally displaced from one another.

More specifically, as illustrated in FIG. 4, the two louvers 16 that are intermediate top and bottom louvers each include two elevationally displaced surfaces. A first louver 16 includes a first surface 16*a* and a second surface 16*b*, where the first surface extends at a greater distance from the side wall 49 than does the second surface. Third and fourth surfaces 16*c*, 16*d* are provided on the other louver 16, wherein the third surface 16*c* extends at a greater distance from the side wall 49 than does the fourth surface 16*d*. However, the second surface 16*b* and the third surface 16*c* are generally coplanar. Thus, the distal surfaces of the two louvers 16 that are intermediate the top and bottom louvers provide for a reduced profile, creating the front recess 46.

Figure 8:
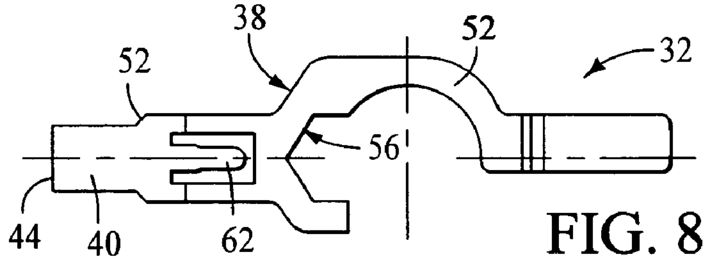
FIG. 8 is a top view of the locking member shown in FIG. 6.
Figure 9:
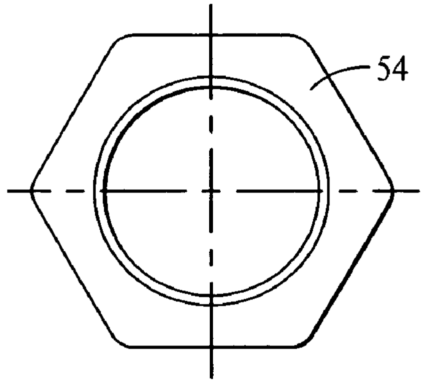
FIG. 9 is a top view of a hex shaped bushing that is press fit on the armature shaft.
Figure 10:
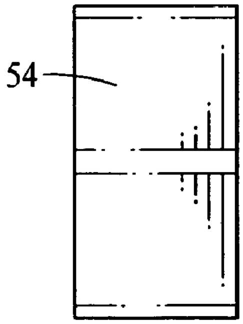
FIG. 10 is a side view of the hex shaped bushing shown in FIG. 9.

Support for the locking member 32 is accordingly provided by the recesses and motor housing 12 in which the member may slide inwardly and outwardly, i.e., to the right and left, respectively, as shown in FIG. 2. To provide further support, as shown in FIGS. 2, 6 and 8, the longitudinal portion 40 that extends outside of the housing preferably includes an enlarged width at location 50 defining shoulders 52 that engage the inside wall of the motor housing 12 and prevent it from moving to the left as shown in FIG. 2.

The spindle lock portion 38 is configured to lockingly engage a bushing 54 that is press fit on the armature shaft 30. While the spindle lock portion 38 and bushing 54 may assume any one of a plurality of corresponding configurations, the preferred embodiment includes a hex bushing. Accordingly, the spindle lock portion 38 of the preferred embodiment is configured to be generally one half of a hex head configuration 56 for engaging the hex-shaped bushing 54. An extension 58 of the spindle lock portion 38 partially surrounds the hex bushing 54 and then extends generally radially toward the rear recess 48 of the gearbox end casting 14. The rear end portion 36 extends from the extension 58 to preferably engage, and be retained within, the rear recess 48. Thus, the locking member 32 extends from a position external to the motor housing 12 and gearbox end casting 14, through the front recess 46, across an internal diameter of the gearbox end casting 14, with the rear end portion 38 preferably engaging the rear recess 48.

As is best shown in FIGS. 2 and 3, a biasing member, preferably a compression spring 60, is provided to bias the locking member 32 in the unlocked position. More specifically, the locking member 32 preferably includes a narrow, elongated protrusion 62 disposed within a portion of the front end portion 34 (FIG. 6), on which protrusion the compression spring 60 is preferably mounted. The protrusion 62 preferably includes a first base diameter around and a second shaft diameter, wherein the base diameter is at least slightly greater than the shaft diameter. As is best illustrated in FIGS. 2 and 4, one end of the compression spring 60 is coiled most tightly around the base diameter, and abuts a surface at the base diameter of the protrusion 62, while an opposite end of the compression spring 62 engages a housing pocket 64. Thus, the spring 60 biases the locking member 32 to the left as shown in FIG. 2 so that the spindle lock portion 38 does not engage the hex shaped bushing 54. However, when the operator exerts sufficient force on the transverse end 44 of the front end portion 34, the spring 60 compresses to permit displacement of the locking member 32, specifically the spindle lock portion 38, to engage the bushing 54 and prevent rotation of the armature shaft 30. Upon release of the transverse end 44, the spring 60 will decompress to bias the locking member 32 back to the left, as illustrated in FIG. 2.

While it is contemplated that the bushing 54 may be configured in one of a plurality of shapes, the hex head bushing is particularly advantageous in that it does not require any cutting of the armature shaft 30 and is inexpensive and effective, requiring only the press-fitting of the bushing to the armature shaft. The use of a hex head configuration for the spindle lock portion 38 and for the bushing 54 is preferred, although other configurations such as square, octagon, slots or notches could be used. An additional advantage of the hex head is that there is engagement with the bushing 54 every 60° of rotation of the saw blade.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A locking mechanism for a rotary power tool of the type having a main motor housing having a rotatable armature shaft with a non-circular configured portion, an end casting attached to the motor housing, the end casting having openings in the outer wall on opposite sides thereof, said locking mechanism comprising:

an elongated locking member having first and second end portions, and being retained within at least one of the motor housing and the end casting and being slideable in a full range of movement between unlocking and locking positions;

said locking member first end portion extending outwardly through one of the openings and being accessible by a user to move said locking member to said locked position wherein said second end portion extends through the other of the openings, said locking member having a locking portion intermediate said first and second end portions that is configured to engage the non-circular configured portion of the rotatable armature shaft and prevent rotation thereof when said locking member is in its locking position; and a biasing element configured to apply a biasing force to said first end portion to bias said locking member through its full range of movement toward said unlocking position.

2. The mechanism as defined in claim 1 wherein the non-circular configuration portion comprises a bushing attached to the rotating armature shaft.

3. The mechanism as defined in claim 2 wherein said bushing is configured to be hexagonal in shape.

4. The mechanism as defined in claim 2 wherein said locking portion is configured to at least partially lockingly correspond to said bushing.

5. The mechanism as defined in claim 4 wherein said locking portion is configured to approximately one-half of a hexagon.

6. The mechanism as defined in claim 1 wherein said first end portion of said elongated locking member is configured to extend outwardly through an interface between the main motor housing and the end casting.

7. The mechanism as defined in claim 1 wherein said second end portion of said elongated locking member is configured to engage a rear wall of the end casting.

8. The mechanism as defined in claim 1 wherein said first end portion comprises an annular shoulder configured to engage a front wall of the end casting.

9. The mechanism as defined in claim 6 further comprising a transverse end at said first end portion of said locking member.

10. The mechanism of claim 1 wherein the end casting includes first and second recesses that are generally diametrically opposed to one another, and said first end portion is retained within the first recess and said second end portion is retained within the second recess.

11. A locking mechanism for a rotary power tool of the type having a main motor housing having a rotatable armature shaft with a non-circular configured portion, a metal end casting attached to the motor housing, and having a pair of openings located on opposite sides of the casting, said locking mechanism comprising:

an elongated member having a first end portion and a second end portion that are retained within diametrically opposed portions of the end casting, said member being movable in a full range of movement between locking and unlocking positions;

said member having a locking portion intermediate said first end portion and said second end portion that is configured to lockingly engage the non-circular configured portion;

wherein said first end portion extends externally of the end casting and the motor housing and has a contact portion disposed at an external end thereof to be contacted by an operator and urged into a locking position;

and wherein said second end portion extends externally of said end casting when said member is in said locking positions; and biasing means for continuously biasing said elongated member through its full range of movement toward its unlocking position.

12. The locking mechanism of claim 11 wherein said locking portion comprises a one-half hex head configuration.

13. The locking mechanism of claim 11 wherein said biasing means comprises a compression spring that is configured to bias said locking means toward its unlocking position.

14. A locking mechanism for a rotary power tool of the type having a main motor housing having a rotatable armature shaft with a non-circular configured portion, an end casting attached to the motor housing, the end casting having openings in the outer wall on opposite sides thereof, said locking mechanism comprising:

an elongated locking member having first and second end portions, and being retained within at least one of the motor housing and the end casting and being slideable between unlocking and locking positions, said locking member first end portion extending outwardly through one of the openings and being accessible by a user to move said locking member to said locked position wherein said second end portion extends through the other of the openings, said locking member having a locking portion intermediate said first and second end portions that is configured to engage the non-circular configured portion of the rotatable armature shaft and prevent rotation thereof when said locking member is in its locking position; and an elongated cylindrically shaped compression spring attached to said first end portion and being oriented to have an outer end for contacting at least one of said motor housing and said end casting, said spring being aligned in the same direction as the direction of movement of said locking member and applying a continuous biasing force to said first end portion to bias said locking member toward said unlocking position.

* * * * *

UNITED STATES PATENT AND TRADEMARK OFFICE

CERTIFICATE OF CORRECTION

PATENT NO. : 7,980,325 B2
APPLICATION NO. : 10/990821
DATED : July 19, 2011
INVENTOR(S) : Botefuhr et al.

It is certified that error appears in the above-identified patent and that said Letters Patent is hereby corrected as shown below:

On the Title Page:

In the first column, after “(65) Prior Publication Data” and the U.S. Publication listing thereafter, insert --(60) Related U.S. Application Data
Provisional Application No. 60/537,105
Jan. 16, 2004--

Signed and Sealed this
Fourteenth Day of February, 2012

David J. Kappos
*Director of the United States Patent and Trademark Office*